J. F. O'BYRNE.
GYROSCOPIC TOP.
APPLICATION FILED OCT. 6, 1910.

999,247.

Patented Aug. 1, 1911.

WITNESSES:
F. C. Barry
Amos W. Hart

INVENTOR
JOSEPH F. O'BYRNE
BY Munn & Co.
ATTORNEYS

UNITED STATES PATENT OFFICE.

JOSEPH FRANCIS O'BYRNE, OF JARBIDGE, NEVADA.

GYROSCOPIC TOP.

999,247.  Specification of Letters Patent.  Patented Aug. 1, 1911.

Application filed October 6, 1910. Serial No. 585,553.

*To all whom it may concern:*

Be it known that I, JOSEPH F. O'BYRNE, a citizen of the United States, and a resident of Jarbidge, in the county of Elko and State of Nevada, have invented certain Improvements in Gyroscopic Tops, of which the following is a specification.

My present invention includes several novel features and improvements in gyroscopic tops, one relating to the construction of the shell or hollow sphere in which the gyroscope proper is inclosed; another feature being the construction and arrangement of the trunnion bearings for the gyroscopic wheel. These and other features hereinafter specified are illustrated in the accompanying drawing, in which—

Figure 1:
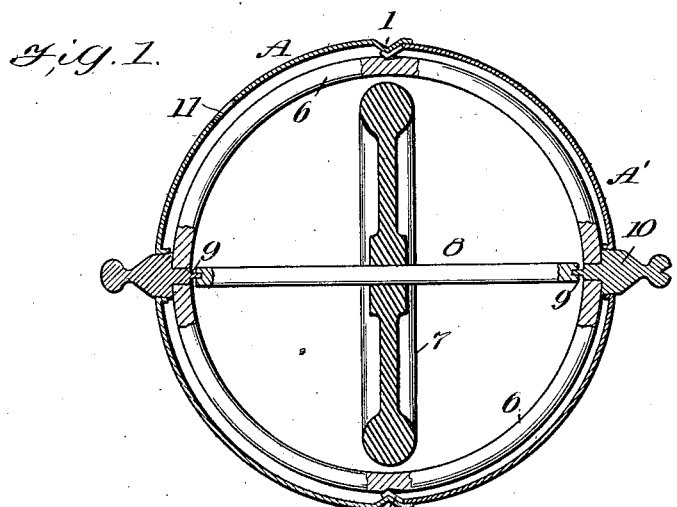
Figure 2:
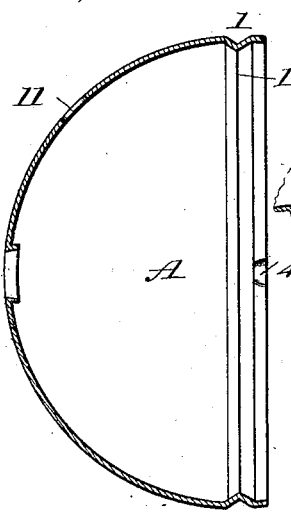
Figure 4:
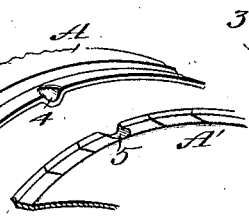
Figure 3:
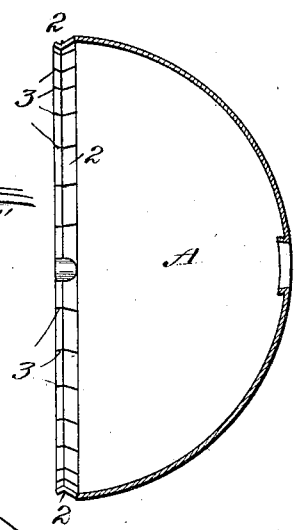
Figure 5:
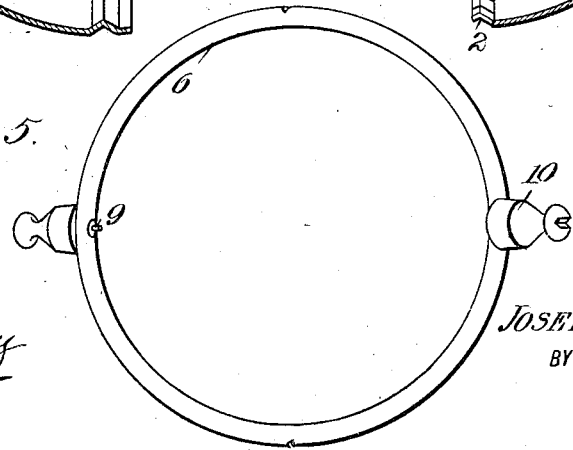

Figure 1 is a central section of the complete gyroscopic top. Figs. 2 and 3 are sectional views of the two hemispherical portions of the hollow sphere in which the gyroscope proper is arranged. Fig. 4 is a perspective view of portions of the hollow sphere which interlock. Fig. 5 is a perspective view of the circular frame or yoke in which the gyroscopic wheel is mounted together with the trunnion bearings for the said frame.

The hollow sphere is formed of two parts, A and A', which are as nearly equal in size as practicable. They may be constructed of various materials, preferably sheet metal or celluloid. The part A is constructed internally with a circumferential rib 1 having a corresponding indent or groove in the outer side. The part A' has a similar rib and groove at its edge, and the latter is provided with a series of transverse slits 3, whereby spring tongues or catches are formed and which are adapted to slide over and engage the rib 1 of part A, as shown in Fig. 1, whereby the two parts A, A', are secured together detachably.

In practice, the sphere will have on its exterior a delineation of a map of the world, and in order to prevent one part rotating on the other and thus destroying the proper relation of one portion of the map to an adjacent one, I provide the meeting edges of the hemispheres with an indent or tooth 4 and socket or recess 5, respectively—see Fig. 4.

Within the sphere A and A' is a circular frame or yoke 6 and the wheel 7 which is located centrally in the latter, its axle 8 having bearings on trunnion points or pivots 9. The steel trunnions proper 10 are conical in form, and the pivots 9 have an enlarged base which is held by friction in radial holes in the frame 6. The pivots are forced into the holes under pressure, and the points project on the inner sides of the frame 6 and into sockets provided in the ends of the axle 8. The conical bodies 10 of the trunnions are also forced in corresponding openings in the hemispherical parts A and A', and their outer ends are formed as knobs for convenience of use or manipulation as usual with tops of this type. The part A of the hollow sphere is provided at 11 with an opening for admission of a string which, in practice, is wound around the axle 8 of the wheel for the purpose of rotating it.

What I claim is:—

1. A gyroscopic top, comprising a hollow sphere, a circular yoke or frame arranged within the sphere, trunnions arranged at opposite points in the sphere and having points projecting through the said frame, and a wheel arranged to rotate within the frame and having an axle whose bearings are on the points of the trunnions, as shown and described.

2. In a gyroscopic top of the type indicated, the combination with a hollow sphere, of trunnions having a conical form and held in openings in the sphere, and a gyroscopic wheel having an axle supported on the trunnions, as shown and described.

3. The hollow sphere provided with conical openings at opposite points and trunnions having a corresponding conical form, the same being forced into the openings and held by friction therein, as shown and described.

4. The combination with a hollow sphere having conical openings at opposite points, a circular yoke or frame arranged within the sphere and provided with radial openings, trunnions which are held by friction in the coincident openings of the sphere and frame, and a gyroscopic wheel having an axle provided with sockets adapted to receive the trunnion points, as shown and described.

JOSEPH FRANCIS O'BYRNE.

Witnesses:
ROY W. FAIRBANK,
DAVID L. MARQUARDSON.